March 14, 1950 G. W. BROWN 2,500,241
BOTTLE HEATER
Filed Aug. 10, 1946
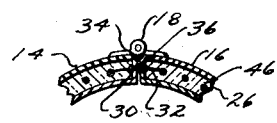
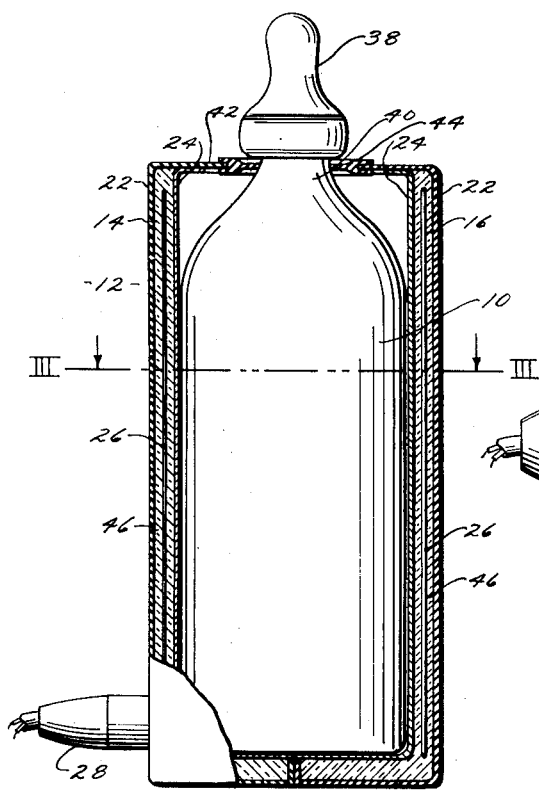
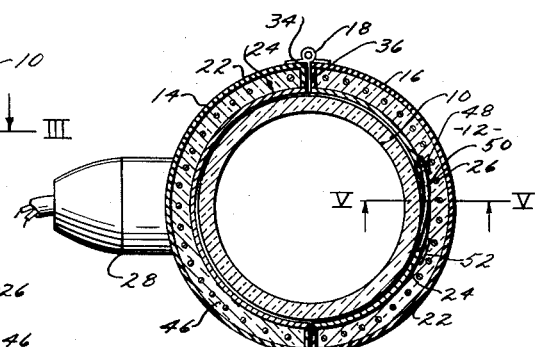
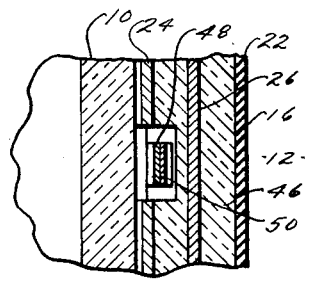
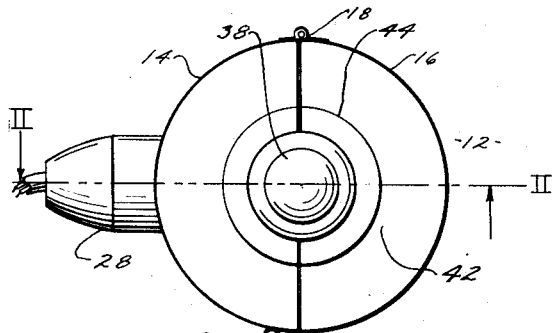
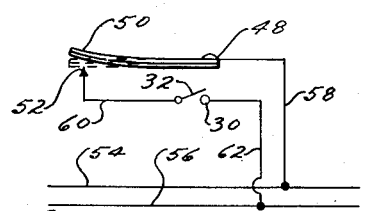
INVENTOR.
George W. Brown
BY
ATTORNEY Patented Mar. 14, 1950

2,500,241

UNITED STATES PATENT OFFICE 2,500,241

BOTTLE HEATER

George W. Brown, Warrensburg, Mo.

Application August 10, 1946, Serial No. 689,747

1 Claim. (Cl. 219—43)

This invention relates to heating appliances and more particularly to bottle heaters of the kind capable of automatically maintaining the contents of a bottle at a predetermined degree of temperature as the same is placed in operative position within a case forming a part of the heater.

The primary object of this invention is to provide a bottle heater having a sectional case formed from a pair of articulated cylinder halves, hingedly joined and designed to embrace the bottle with the neck thereof extending beyond the confines of the case.

An important object of this invention is to provide a bottle heater having a sectional case of the aforesaid character, provided with an inner and outer wall to present a space for mounting an electrical heating element, and in addition to provide suitable insulation for protecting the user against injury from both electrical current and heat emanating from the case.

Another important object of this invention is to provide in a bottle heater having a case and a heating element mounted therein, a thermostatic control fixed to a wall of said case in contacting relation with the bottle embraced by the case and capable of closing an electric circuit through the heating element as the contents of the bottle cool beyond a predetermined temperature.

Additional objects of this invention include a bottle heater particularly adapted for baby bottles, having means for protecting the nipple thereof from the heat within the case therefor; and the provision of means for rendering the heating element ineffective as the bottle is removed or placed in the case.

Other objects of this invention will be made clear or become apparent throughout the following specification, referring to the accompanying drawing wherein:

Figure 1 is a top plan view of the bottle heater made in accordance with my present invention.

Fig. 2 is a fragmentary cross-sectional view taken on line II—II of Fig. 1.

Fig. 3 is a cross-sectional view taken on line III—III of Fig. 2.

Fig. 4 is a detailed, fragmentary cross-sectional view showing the manner of interconnecting parts of the heating element.

Fig. 5 is a fragmentary, cross-sectional view taken on line V—V of Fig. 3; and

Fig. 6 is a diagrammatical view of the electrical circuit embodied in my invention.

A sectional case for embracing a baby bottle or the like 10 is broadly designated by the numeral 12 and comprises a pair of articulated cylinder halves 14 and 16, hingedly joined as at 19 and held together by a suitable latching assembly 20. Each of the cylinder halves 14 and 16 has an outer wall 22 and an inner wall 24 respectively, between which walls 22 and 24 is interposed a heating element 26.

This heating element 26 is of the well-known type, and the portion thereof disposed within the section 14 is connected to a conventional electrical outlet 28 mounted on the section 14 and in communication with a source of electrical current (not shown). The portions of the heating element 26 mounted in each section 14 and 16 respectively are connected by means of a pair of terminal contact members 30 and 32 mounted on proximal end walls 34 and 36 of sections 14 and 16 respectively. As the case 12 is opened and closed therefore, members 30 and 32 will be moved out of contact and into contact with each other respectively, so that electrical current will flow through the heating element only when the case 12 is in a closed position.

It is contemplated that the bottle 10 be placed within the case 12 with the nipple 38 thereof mounted thereon so that the same may be placed in use by the infant while the bottle 10 is within the case 12. The neck 40 of the bottle 10 extends beyond the confines of the case 12 through an opening formed in the uppermost end 42 of the case 12. This opening is formed by cutting away a portion of each of the sections 14 and 16 at contiguous edges thereof, and a washer 44 is mounted therein. The washer 44 is formed of a pair of symmetrical parts on each of sections 14 and 16 and encircles the neck 40 of bottle 10 for preventing the escape of heat within the case 12. The nipple 38 will not be damaged by the heat and therefore will not be injurious to the child when placed in use. Any flexible material such as rubber or the like provides a suitable material for the washer 44.

The heating element 26 circumscribes the inner walls 24 of the case 12 and is held out of contact with the walls 22 and 24 of each section 14 and 16 by being imbedded in a body 46 of material that is capable of maintaining heating element 26 in operative position and of material that will conduct heat from the resistor wires thereof. Such material is illustrated in the drawing as consisting of glass or porcelain but any insulating material capable of also resisting the flow of electric current will be found to be suitable. The inner walls 24 are preferably formed of sheet metal or other suitable material having heat-conducting properties, whereas the outer walls 22 consist of insulating material of a nature capable of resisting heat emanating from the body 46.

A thermostat 48 is mounted on the inner wall 24 of the section 16 as illustrated in Figs. 3 and 5 to control the temperature of the contents within the bottle 10. This thermostat 48 is of the conventional type and the operation thereof is well understood by those skilled in the art. It includes a bi-metallic bar 50 and as the temperature within the case 12 changes, this bar 50 moves toward and from a contact point 52. As the bottle 10 is placed in the case 12, the side thereof contacts the bar 50, and the thermostat 48 is so regulated as to cause the bar 50 to move into engagement with the contact point 52 when the temperature of the contents of bottle 10 falls below a predetermined temperature.

In the wiring diagram shown in Fig. 6, the numerals 54 and 56 designate the power supply lines leading into the outlet 28 and the numerals 58, 60 and 62 illustrate diagrammatically the resistance wires forming a part of the heating element 26. It is clear therefore that when the case 12 is closed and terminals 30 and 32 are closed, and when the bi-metallic bar 50 is in engagement with contact point 52, a circuit is closed through the heating element 26. This circuit is traced as follows:

From lead line 54, through resistance wire 58 of the portion of heating element 26 disposed in section 16, bar 50, contact point 52, wire 60, terminal points 32 and 30, resistance wire 62 of the portion of heating element 26 within section 14, to power supply line 56.

With the bottle heater made in accordance with the foregoing description it is readily seen that the case 12 with the bottle 10 enclosed therein may be placed within easy reach of the infant at all times and when connected to a source of electric current, the milk or other contents of the bottle 10 will always remain at a certain temperature without attention. No injury to the user will occur either from electrical shock or excessive heat, and the nipple 38 will not be damaged by heat within the case 12. As it becomes necessary to replace an empty bottle with a full one, the case 12 is opened by simply releasing the latch 20 whereupon the circuit is broken by separation of contacts 30 and 32. And as the case is closed upon a full bottle, the thermostat 48 will automatically close the circuit if the contents of the full bottle are cool when placed therein.

While it is contemplated that a large number of advantages not herein set forth will arise from the employment of the bottle heater made in accordance with this invention, it is desired to be limited only by the spirit of the invention and scope of the appended claim.

Having thus described the invention, what is claimed as new and desired to be secured by Letters Patent is:

A heater for bottles having a relatively small neck, said heater comprising an elongated, hollow case having an outer wall of low heat conductivity and an inner wall of high heat conductivity and adapted to engage substantially all of the bottle when the latter is in the case, one end of the case having an opening provided with a resilient member for tightly encircling the neck of said bottle, said case being split longitudinally through said opening and said member to present a pair of symmetrical sections; hinge means on the side walls of the sections adjacent one pair of proximal edges thereof for joining the sections; an electrical heating element for each section respectively and disposed between the walls thereof, each element having a contact point extending through said inner wall adjacent one edge of the corresponding section, said contact points being movable into and out of engagement as the sections are moved on said hinge means to and from a closed position respectively; electrical conductors connected with one of said heating elements and extending through said outer wall; and a thermostat common to said heating elements having heat sensitive parts within the case and movable to and from a position in engagement with said bottle therein.

GEORGE W. BROWN.

REFERENCES CITED

The following references are of record in the file of this patent:

UNITED STATES PATENTS

| Number | Name | Date |
|---|---|---|
| 947,914 | Junkers | Feb. 1, 1910 |
| 1,033,799 | Harvey | July 30, 1912 |
| 1,414,494 | Arntfield | May 2, 1922 |
| 1,604,972 | Clarke | Nov. 2, 1926 |
| 1,656,662 | Carter et al. | Jan. 17, 1928 |
| 1,966,949 | Goldstein | July 17, 1934 |
| 1,971,387 | Scoville | Aug. 28, 1934 |
| 2,245,762 | De Stefani et al. | June 17, 1941 |